US006969561B2

(12) United States Patent
de Vaal et al.

(10) Patent No.: US 6,969,561 B2
(45) Date of Patent: *Nov. 29, 2005

(54) FUEL CELL AMBIENT ENVIRONMENT MONITORING AND CONTROL APPARATUS AND METHOD

(75) Inventors: Jake de Vaal, Coquitlam (CA); Harvindra Deo, Coquitlam (CA)

(73) Assignee: Ballard Power Systems Inc., Burnaby (CA)

(*) Notice: Subject to any disclaimer, the term of this patent is extended or adjusted under 35 U.S.C. 154(b) by 0 days.

This patent is subject to a terminal disclaimer.

(21) Appl. No.: 10/890,910

(22) Filed: Jul. 14, 2004

(65) Prior Publication Data

US 2004/0265658 A1    Dec. 30, 2004

Related U.S. Application Data

(63) Continuation of application No. 09/916,241, filed on Jul. 25, 2001, now Pat. No. 6,815,101.

(51) Int. Cl.[7] .............................................. H01M 8/04
(52) U.S. Cl. ............................. 429/13; 429/22; 429/24
(58) Field of Search ............................. 429/13, 22, 24; 702/24

(56) References Cited

U.S. PATENT DOCUMENTS

| | | | |
|---|---|---|---|
| 2,988,656 A | 6/1961 | Grobel ........................ 310/53 |
| 3,061,658 A | 10/1962 | Blackmer .................... 136/86 |
| 4,078,893 A | 3/1978 | Gilman et al. .......... 23/253 TP |
| 4,197,675 A | 4/1980 | Kelly ............................ 49/31 |
| 5,074,137 A | 12/1991 | Harris et al. ............... 73/31.02 |
| 5,132,663 A | 7/1992 | Strobl et al. ................. 340/438 |
| 5,199,396 A | 4/1993 | Shelef et al. ........... 123/198 D |
| 5,392,873 A | 2/1995 | Masuyama et al. ........ 180/68.5 |
| 5,397,655 A | 3/1995 | Bette et al. .................... 429/13 |
| 5,478,662 A | 12/1995 | Strasser ........................ 429/13 |
| 5,763,113 A | 6/1998 | Meltser et al. ................ 429/13 |
| 6,124,054 A | 9/2000 | Gorman et al. ............... 429/34 |
| 6,140,820 A | 10/2000 | James ........................ 324/434 |
| 6,159,626 A | 12/2000 | Keskula et al. ............... 429/22 |
| 6,290,594 B1 | 9/2001 | Osborne ...................... 454/75 |
| 6,461,751 B1 | 10/2002 | Boehm et al. ................ 429/13 |
| 2001/0018142 A1 | 8/2001 | Kato et al. .................... 429/22 |
| 2003/0022031 A1 | 1/2003 | Manery ......................... 429/7 |
| 2003/0022036 A1 | 1/2003 | Parr ............................. 429/22 |
| 2003/0022037 A1 | 1/2003 | Parr et al. ..................... 429/22 |

(Continued)

FOREIGN PATENT DOCUMENTS

EP            982 788 A2    3/2000

(Continued)

OTHER PUBLICATIONS

Abstract of JP 60-212966, esp@cenet database, Oct. 25, 1985.

(Continued)

Primary Examiner—Jonathan Crepeau
(74) Attorney, Agent, or Firm—Seed IP Law Group PLLC

(57) ABSTRACT

An electrochemical power generation system includes a fuel cell stack having an oxidant delivery system, an oxygen sensor for measuring the oxygen concentration of ambient air in the vicinity of the power generation system, and a hydrogen concentration sensor for measuring a hydrogen concentration in the ambient air in the vicinity of the power generation system. A controller is configured to cease operation of the power generation system, for example ceasing delivery of fuel to the fuel cell stack, when either the hydrogen concentration measured by the hydrogen concentration sensor exceeding a hydrogen concentration threshold or the oxygen concentration measured by the oxygen sensor falling below an oxygen concentration threshold.

19 Claims, 9 Drawing Sheets

U.S. PATENT DOCUMENTS

| | | | |
|---|---|---|---|
| 2003/0022040 A1 | 1/2003 | Wells | 429/23 |
| 2003/0022041 A1 | 1/2003 | Barton et al. | 429/23 |
| 2003/0022042 A1 | 1/2003 | Wells et al. | 429/23 |
| 2003/0022045 A1 | 1/2003 | Wells et al. | 429/26 |
| 2003/0022050 A1 | 1/2003 | Barton et al. | 429/34 |

FOREIGN PATENT DOCUMENTS

| | | |
|---|---|---|
| EP | 1 037 041 A2 | 9/2000 |
| JP | 1-089155 | 4/1989 |
| JP | 6-243886 | 9/1994 |
| JP | 7-169481 | 7/1995 |
| JP | 8-088014 | 4/1996 |
| WO | WO 00/02282 | 1/2000 |
| WO | WO 00/74162 A1 | 12/2000 |
| WO | WO 01/26174 A1 | 4/2001 |

OTHER PUBLICATIONS

Abstract of JP 63-241876, esp@cenet database, Oct. 7, 1988.
Abstract of JP 2-078159, esp@cenet database, Mar. 19, 1990.
Abstract of JP 4-115467, esp@cenet database, Apr. 16, 1992.
Abstract of JP 4-220955, esp@cenet database, Aug. 11, 1992.
Abstract of JP 6-084536, esp@cenet database, Mar. 25, 1994.
Abstract of JP 7-325075, esp@cenet database, Dec. 12, 1995.
Abstract of JP 8-162138, esp@cenet database, Jun. 21, 1996.
Abstract of JP 8-185879, esp@cenet database, Jul. 16, 1996.
Abstract of JP 2000-009685, esp@cenet database, Jan. 14, 2000.

FUEL CELL AMBIENT ENVIRONMENT MONITORING AND CONTROL APPARATUS AND METHOD

BACKGROUND OF THE INVENTION

1. Technical Field

The present invention relates to fuel cells, and particularly to monitoring and control systems for fuel cells.

2. Description of the Related Art

Electrochemical fuel cells convert fuel and oxidant to electricity. Solid polymer electrochemical fuel cells generally employ a membrane electrode assembly ("MEA") which comprises an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit. Typically, a number of MEAs are serially coupled electrically to form a fuel cell stack having a desired power output.

In typical fuel cells, the MEA is disposed between two electrically conductive fluid flow field plates or separator plates. Fluid flow field plates have at least one flow passage formed in at least one of the major planar surfaces thereof. The flow passages direct the fuel and oxidant to the respective electrodes, namely, the anode on the fuel side and the cathode on the oxidant side. The fluid flow field plates act as current collectors, provide support for the electrodes, provide access channels for the fuel and oxidant to the respective anode and cathode surfaces, and provide channels for the removal of reaction products, such as water, formed during operation of the cell.

Due to their zero- or low-emission nature, and ability to operate using renewable fuels, the use of fuel cells as primary and/or backup power supplies is likely to become increasingly prevalent. For example, a fuel cell stack can serve as an uninterruptible power supply for computer, medical, or refrigeration equipment in a home, office, or commercial environment. Other uses are of course possible. Operating and environmental factors relevant to efficient fuel cell system operation may include the concentration of hydrogen in the surrounding environment, the concentration of oxygen in the surrounding environment, fuel cell stack temperature, ambient air temperature, current flow through the fuel cell stack, voltage across the fuel cell stack, and voltage across the MEAs. These factors become increasingly relevant when the fuel cell operating environment is a human habitable space with a low air flow exchange rate and/or when the space is small, such as a utility room or closet.

Consequently, there is a need for improved control systems for fuel cell systems, particularly for fuel cell systems that operate in enclosed environments and/or habitable environments, and for methods of controlling such fuel cell systems.

BRIEF SUMMARY OF THE INVENTION

An electrochemical power generation system may comprise a fuel cell stack including at least one fuel cell, an oxidant inlet, an oxidant outlet, a fuel inlet and a fuel outlet, a fuel delivery system for delivering fuel to the fuel inlet of the stack, an oxidant delivery system for delivering oxidant to the oxidant inlet of the stack. An oxygen sensor may be positioned to measure an oxygen concentration of ambient air in the vicinity of the power generation system.

A hydrogen concentration sensor may measure a hydrogen concentration in the ambient air in the vicinity of the power generation system. A controller may be coupled to the oxygen and hydrogen sensors, and configured to cease the delivery of fuel to the fuel cell stack in response to the hydrogen concentration of the ambient air in the vicinity of the power generation system exceeding a hydrogen concentration threshold or the oxygen concentration of the ambient air in the vicinity of the power generation system falling below an oxygen concentration threshold. The hydrogen concentration threshold may be suitably set at 1%, and the oxygen concentration threshold set at 18%, for example.

Other functions and/or components of the power generation system may also be ceased or stopped in response to the conditions, while some functions and/or components may continue operating, such as the controller, sensors, etc., which may be powered by an alternative power source such as a battery after the fuel cell stack stops producing power. The power generation system is particularly suitable for operation inside a habitable, confined space, such as a small room or a closet.

The electrochemical power generation system may also include a purge valve that is associated with the fuel outlet. The controller may be coupled to the purge valve and be configured to intermittently open the purge valve such that the hydrogen discharged from the fuel cell stack during operation of the power generation system does not cause the hydrogen concentration in the vicinity of the power generation system to exceed a high hydrogen concentration condition before the oxygen concentration in the vicinity of the power generation system falls below the oxygen concentration threshold. In particular, the controller may be configured to intermittently open the purge valve such that the average continuous rate of hydrogen discharged from the fuel cell stack during operation of the power generation system does not exceed a critical hydrogen discharge rate that would cause the hydrogen concentration in the vicinity of the power generation system to exceed a high hydrogen concentration condition before the oxygen concentration in the vicinity of the power generation system falls below the oxygen concentration threshold. The high hydrogen concentration condition may be set to correspond to a lower flammability limit of hydrogen, which is typically approximately 4% of atmosphere.

The electrochemical power generation system may further include a temperature sensor, in which case the controller may be configured to cease delivery of fuel to the fuel cell stack in response to a temperature reading that exceeds a high temperature threshold.

Accordingly, in one aspect an electrochemical power generation system comprises a fuel cell stack comprising at least one fuel cell, an oxidant inlet, an oxidant outlet, a fuel inlet and a fuel outlet; a fuel delivery system for delivering fuel to the fuel inlet of the stack; an oxidant delivery system for delivering oxidant to the oxidant inlet of the fuel cell stack; an oxygen sensor for measuring an oxygen concentration of ambient air in a vicinity of the power generation system; a hydrogen concentration sensor for measuring a hydrogen concentration in the ambient air in the vicinity of the power generation system; and a controller communicatingly coupled to receive signals from the oxygen sensor and from the hydrogen concentration sensor, the controller configured to cease delivery of fuel to the fuel cell stack by the fuel delivery system in response to the earlier of either the hydrogen concentration measured by the hydrogen concentration sensor exceeding a hydrogen concentration threshold or the oxygen concentration measured by the oxygen sensor falling below an oxygen concentration threshold.

In another aspect, a method of operating a fuel cell electrochemical power generation system comprises delivering fuel to a fuel cell stack; delivering oxidant to the fuel cell stack; monitoring an oxygen concentration of ambient air in a vicinity of the power generation system; monitoring a hydrogen concentration of the ambient air in the vicinity of the power generation system; and ceasing the delivery of fuel to the fuel cell stack in response to the earlier of either the hydrogen concentration of the ambient air in the vicinity of the power generation system exceeding a hydrogen concentration threshold or the oxygen concentration of the ambient air in the vicinity of the power generation system falling below an oxygen concentration threshold.

According to yet another aspect of the invention, there is provided a computer-readable media that contains instructions to cause a controller to control operation of a fuel cell stack by monitoring an oxygen concentration of ambient air in a vicinity of the power generation system; monitoring a hydrogen concentration of the ambient air in the vicinity of the power generation system; and ceasing the delivery of fuel to the fuel cell stack in response to the earlier of either the hydrogen concentration of the ambient air in the vicinity of the power generation system exceeding a hydrogen concentration threshold or the oxygen concentration of the ambient air in the vicinity of the power generation system falling below an oxygen concentration threshold.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, have been selected solely for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well known structures associated with fuel cells, microcontrollers, sensors, and actuators have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

Fuel Cell System Overview

Figure 1:
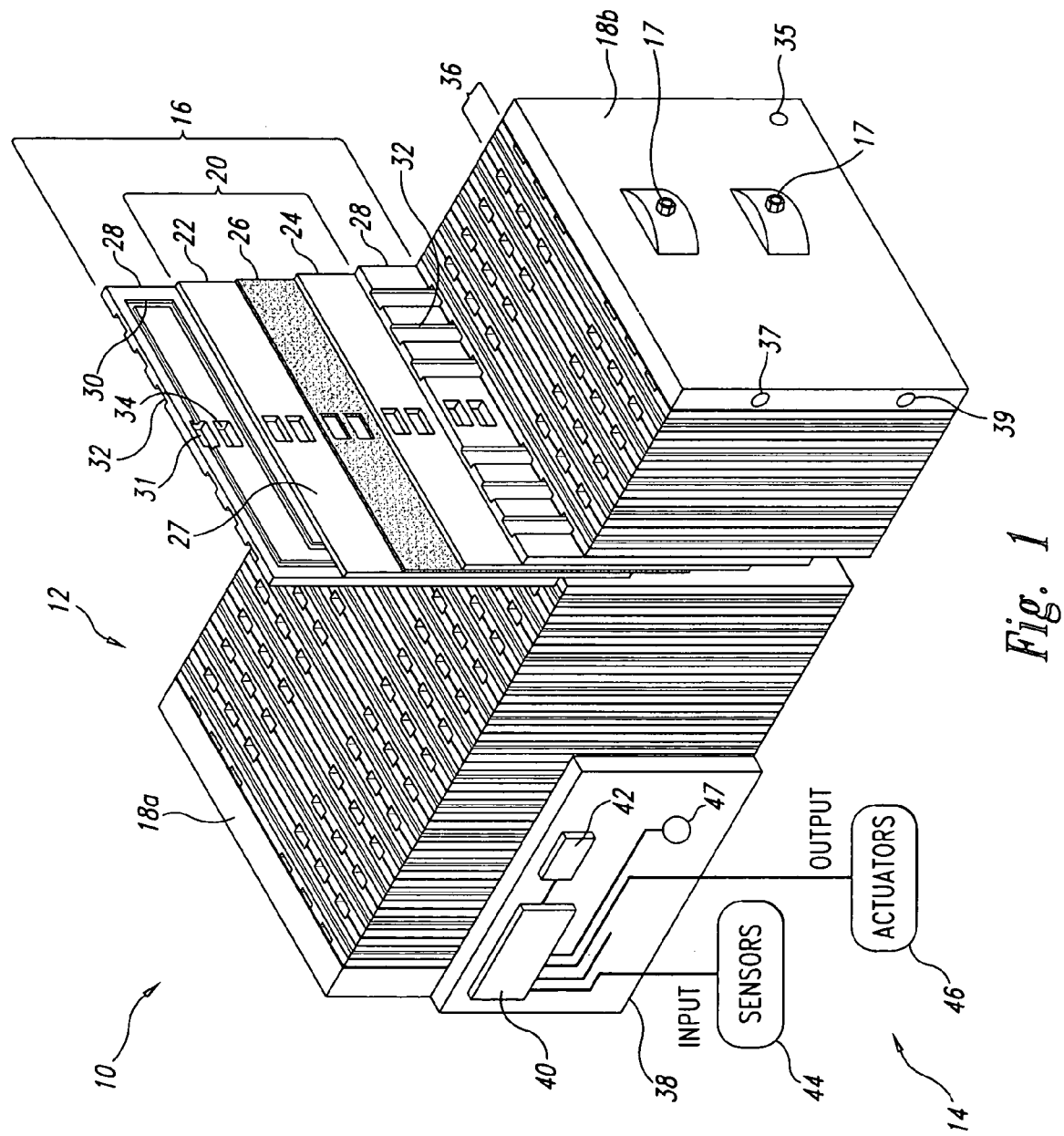
FIG. 1 is an isometric, partially exploded, view of a fuel cell system including a fuel cell stack and controlling electronics including a fuel cell ambient environment monitoring and control system.

FIG. 1 shows a portion of a fuel cell system 10, namely, a fuel cell stack 12 and an electronic fuel cell monitoring and control system 14. Fuel cell stack 12 includes a number of fuel cell assemblies 16 arranged between a pair of end plates 18a, 18b, one of the fuel cell assemblies 16 being partially removed from fuel cell stack 12 to better illustrate the structure of fuel cell assembly 16. Tie rods (not shown) extend between end plates 18a, 18b and cooperate with fastening nuts 17 to bias end plates 18a, 18b together by applying pressure to the various components to ensure good contact therebetween.

Each fuel cell assembly 16 includes a membrane electrode assembly 20 including two electrodes, the anode 22 and the cathode 24, separated by an ion exchange membrane 26. Electrodes 22, 24 can be formed from a porous, electrically conductive sheet material, such as carbon fiber paper or cloth, that is permeable to the reactants. Each of electrodes 22, 24 is coated on a surface adjacent the ion exchange membrane 26 with a catalyst 27, such as a thin layer of platinum, to render each electrode electrochemically active.

Fuel cell assembly 16 also includes a pair of separators or flow field plates 28 sandwiching membrane electrode assembly 20. In the illustrated embodiment, each of the flow field plates 28 includes one or more reactant channels 30 formed on a planar surface of flow field plate 28 adjacent an associated one of the electrodes 22, 24 for carrying fuel to anode 22 and oxidant to cathode 24, respectively. (Reactant channel 30 on only one of flow field plates 28 is visible in FIG. 1.) Reactant channels 30 that carry the oxidant also carry exhaust air and product water away from cathode 24. As will be described in more detail below, fuel stack 12 is designed to operate in a dead-ended fuel mode, thus substantially all of the hydrogen fuel supplied to it during operation is consumed, and little if any hydrogen is carried away from stack 12 in normal operation of system 10. However, embodiments of the present invention can also be applicable to fuel cell systems operating on dilute fuels which are not dead-ended.

In the illustrated embodiment, each flow field plate 28 preferably includes a plurality of cooling channels 32 formed on the planar surface of the flow field plate 28 opposite the planar surface having reactant channel 30. When the stack 12 is assembled, cooling channels 32 of each adjacent fuel cell assembly 16 cooperate so that closed cooling channels 32 are formed between each membrane electrode assembly 20. The cooling channels 32 transmit cooling air through fuel stack 12. The cooling channels are preferably straight and parallel to each other, and traverse each plate 28 so that cooling channel inlets and outlets are located at respective edges of plate 28.

While the illustrated embodiment includes two flow field plates 28 in each fuel cell assembly 16, other embodiments can include a single bipolar flow field plate (not shown) between adjacent membrane electrode assemblies 20. In such embodiments, a channel on one side of the bipolar plate carries fuel to the anode of one adjacent membrane electrode assembly 20, while a channel on the other side of the plate carries oxidant to the cathode of another adjacent membrane electrode assembly 20. In such embodiments, additional flow field plates 28 having channels for carrying coolant (e.g., liquid or gas, such as cooling air) can be spaced throughout fuel cell stack 12, as needed to provide sufficient cooling of stack 12.

End plate 18a includes a fuel stream inlet port (not shown) for introducing a supply fuel stream into fuel cell stack 12. End plate 18b includes a fuel stream outlet port 35 for discharging an exhaust fuel stream from fuel cell stack 12 that comprises primarily water and non-reactive components and impurities, such as any introduced in the supply fuel stream or entering the fuel stream in stack 12. Fuel stream outlet port 35 is normally closed with a valve in dead-ended operation. Although fuel cell stack 12 is designed to consume substantially all of the hydrogen fuel supplied to it during operation, traces of unreacted hydrogen may also be discharged through the fuel stream outlet port 35 during a purge of fuel cell stack 12, effected by temporarily opening a valve at fuel stream outlet port 35. Each fuel cell assembly 16 has openings formed therein to cooperate with corresponding openings in adjacent assemblies 16 to form internal fuel supply and exhaust manifolds (not shown) that extend the length of stack 12. The fuel stream inlet port is fluidly connected to fluid outlet port 35 via respective reactant channels 30 that are in fluid communication with the fuel supply and exhaust manifolds, respectively.

End plate 18b includes an oxidant stream inlet port 37 for introducing supply air (oxidant stream) into fuel cell stack 12, and an oxidant stream outlet port 39 for discharging exhaust air from fuel cell stack 12. Each fuel cell assembly 16 has openings 31, 34, formed therein to cooperate with corresponding openings in adjacent fuel cell assemblies 16 to form oxidant supply and exhaust manifolds that extend the length of stack 12. Oxidant inlet port 37 is fluidly connected to oxidant outlet port 39 via respective reactant channels 30 that are in fluid communication with oxidant supply and exhaust manifolds, respectively.

In one embodiment, fuel cell stack 12 includes forty-seven fuel cell assemblies 16. (FIGS. 1 and 2 omit a number of the fuel cell assemblies 16 to enhance drawing clarity). Fuel cell stack 12 can include a greater or lesser number of fuel cell assemblies to provide more or less power, respectively.

Figure 2:
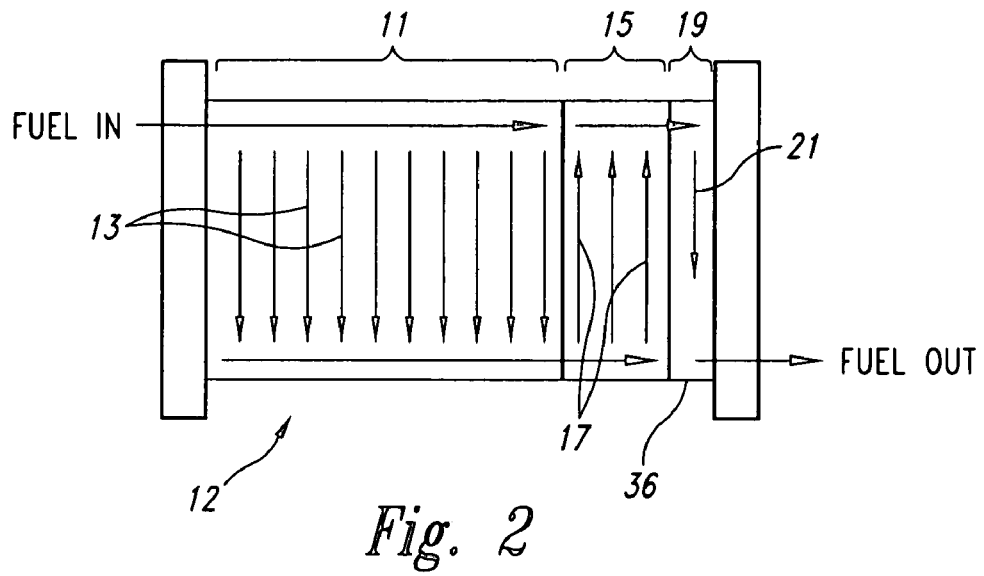
FIG. 2 is a schematic diagram representing fuel flow through a cascaded fuel cell stack of the fuel cell system of FIG. 1.

As shown in FIG. 2, fuel is directed through fuel cell stack 12 in a cascaded flow pattern. A first set 11 composed of the first forty-three fuel cell assemblies 16 are arranged so that fuel flows within the set in a concurrent parallel direction (represented by arrows 13) that is generally opposite the direction of the flow of coolant through fuel cell stack 12. Fuel flow through a next set 15 of two fuel cell assemblies 16 is in series with respect to the flow of fuel in the first set 11, and in a concurrent parallel direction within the set 15 (in a direction represented by arrows 17) that is generally concurrent with the direction of the flow of coolant through fuel cell stack 12. Fuel flow through a final set 19 of two fuel cells assemblies 16 is in series with respect to the first and second sets 11, 15, and in a concurrent parallel direction within the set 19 (in a direction represented by arrow 21) generally opposite the flow of coolant through the fuel cell stack 12. The oxidant is supplied to each of the forty-seven fuel cells in parallel, in the same general direction as the flow of coolant through fuel cell stack 12.

The final set 19 of fuel cell assemblies 16 comprises the purge cell portion 36 of the fuel cell stack. The purge cell portion 36 accumulates non-reactive components which are periodically vented by opening a purge valve.

Each membrane electrode assembly 20 is designed to produce a nominal potential difference of about 0.6 V between anode 22 and cathode 24. Reactant streams (hydrogen and air) are supplied to electrodes 22, 24 on either side of ion exchange membrane 26 through reactant channels 30. Hydrogen is supplied to anode 22, where platinum catalyst 27 promotes its separation into protons and electrons, which pass as useful electricity through an external circuit (not shown). On the opposite side of membrane electrode assembly 20, air flows through reactant channels 30 to cathode 24 where oxygen in the air reacts with protons passing through the ion exchange membrane 26 to produce product water.

Fuel Cell System Sensors and Actuators

With continuing reference to FIG. 1, electronic fuel cell monitoring and control system 14 comprises various electrical and electronic components on a circuit board 38 and various sensors 44 and actuators 46 distributed throughout fuel cell system 10. Circuit board 38 carries a microprocessor or microcontroller 40 that is appropriately programmed or configured to carry out fuel cell system operation. Microcontroller 40 can take the form of an Atmel AVR RISC microcontroller available from Atmel Corporation of San Jose, Calif. The electronic monitoring and control system 14 also includes a persistent memory 42, such as an EEPROM portion of the microcontroller 40 or discrete nonvolatile controller-readable media.

Microcontroller 40 is coupled to receive input from sensors 44 and to provide output to actuators 46. The input and/or output can take the form of either digital and/or analog signals. A rechargeable battery 47 powers the electronic fuel cell monitoring and control system 14 until fuel cell stack 12 can provide sufficient power to electronic fuel cell monitoring and control system 14. Microcontroller 40 is selectively couplable between fuel cell stack 12 and battery 47 for switching power during fuel cell system operation and/or to recharge battery 47 during fuel cell operation.

Figure 3:
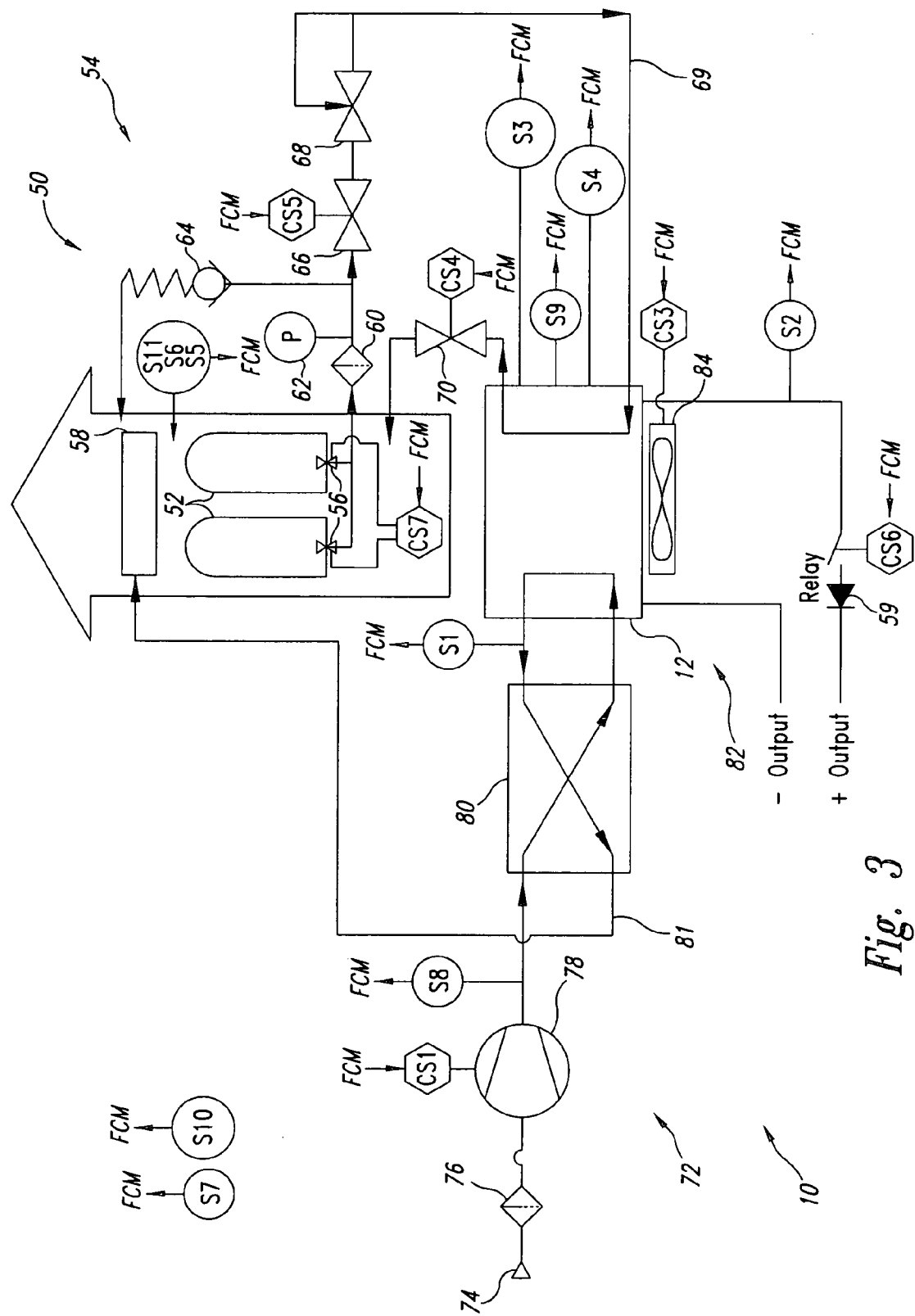
FIG. 3 is a schematic diagram of a portion of the fuel cell ambient environment monitoring and control system of FIG. 1.

FIG. 3 shows various elements of fuel cell system 10 in further detail, and shows various other elements that were omitted from FIG. 1 for clarity of illustration.

With particular reference to FIG. 3, fuel cell system 10 provides fuel (e.g., hydrogen) to anode 22 by way of a fuel system 50. Fuel system 50 includes a source of fuel such as one or more fuel tanks 52, and a fuel regulating system 54 for controlling delivery of the fuel. Fuel tanks 52 can contain hydrogen, or some other fuel such as methanol. Alternatively, fuel tanks 52 can represent a process stream from which hydrogen can be derived by reforming, such as methane or natural gas (in which case a reformer is provided in fuel cell system 10).

Fuel tanks 52 each include a fuel tank valve 56 for controlling the flow of fuel from respective fuel tank 52. Fuel tank valves 56 may be automatically controlled by microcontroller 40, and/or manually controlled by a human operator. Fuel tanks 52 may be refillable, or may be disposable. Fuel tanks 52 may be integral to fuel system 50 and/or fuel cell system 10, or can take the form of discrete units. In this embodiment, fuel tanks 52 are hydride storage tanks. Fuel tanks 52 are positioned within the fuel cell system 10 such that they are heatable by exhaust cooling air warmed by heat generated by fuel cell stack 12. Such heating facilitates the release of hydrogen from the hydride storage media.

Fuel system 50 includes a hydrogen concentration sensor S5, hydrogen heater current sensor S6 and a hydrogen sensor check sensor S11. Hydrogen heater current sensor S6 can take the form of a current sensor that is coupled to monitor a hydrogen heater element that is an integral component of a hydrogen concentration sensor S5. Hydrogen sensor check sensor S11 monitors voltage across a positive leg of a Wheatstone bridge in a hydrogen concentration sensor S5, discussed below, to determine whether hydrogen concentration sensor S5 is functioning.

Fuel tanks 52 are coupled to the fuel regulating system 54 through a filter 60 that ensures that particulate impurities do not enter fuel regulating system 54. Fuel regulating system 54 includes a pressure sensor 62 to monitor the pressure of fuel in fuel tanks 52, which indicates how much fuel remains in fuel tanks 52. A pressure relief valve 64 automatically operates to relieve excess pressure in fuel system 50. Pressure relief valve 64 can take the form of a spring and ball relief valve. A main gas valve solenoid CS5 opens and closes a main gas valve 66 in response to signals from the microcontroller 40 to provide fluid communication between the fuel tanks 52 and fuel regulating system 54. Additional controllers such as a hydride valve solenoid CS7 controls flow through the fuel tank valves 56. A hydrogen regulator 68 regulates the flow of hydrogen from fuel tanks 52. Fuel is delivered to the anodes 22 of the fuel cell assemblies 16 through a hydrogen inlet conduit 69 that is connected to fuel stream inlet port of stack 12.

Sensors 44 of the electronic monitoring and control system 14 monitor a number of fuel cell system operating parameters to maintain fuel cell system operation within acceptable limits. For example, a stack voltage sensor S3 measures the gross voltage across fuel cell stack 12. A purge cell voltage sensor S4 monitors the voltage across purge cell portion 36 (the final set 19 of fuel cell assemblies 16 in cascaded design of FIG. 2). A cell voltage checker S9 ensures that a voltage across each of the fuel cell assemblies 16 is within an acceptable limit. Each of the sensors S3, S4, S9 provide inputs to microcontroller 40, identified in FIG. 3 by arrows pointing toward the blocks labeled "FCM" (i.e., fuel cell microcontroller 40).

A fuel purge valve 70 is provided at fuel stream outlet port 35 of fuel cell stack 12 and is typically in a closed position when stack 12 is operating. Fuel is thus supplied to fuel cell stack 12 only as needed to sustain the desired rate of electrochemical reaction. Because of the cascaded flow design, any impurities (e.g., nitrogen) in the supply fuel stream tend to accumulate in purge cell portion 36 during operation. A build-up of impurities in purge cell portion 36 tends to reduce the performance of purge cell portion 36; should the purge cell voltage sensor S4 detect a performance drop below a threshold voltage level, microcontroller 40 may send a signal to a purge valve controller CS4 such as a solenoid to open the purge valve 36 and discharge the impurities and other matter that may have accumulated in purge cell portion 36 (collectively referred to as "purge discharge"). The venting of hydrogen by the purge valve 70 during a purge is preferably limited (e.g., to less than 1 liter/minute on a continuous basis) ("average hydrogen discharge rate") to prevent the ambient environment monitoring and control systems, discussed below, from triggering a failure or fault.

Fuel cell system 10 provides oxygen in an air stream to the cathode side of membrane electrode assemblies 20 by way of an oxygen delivery system 72. A source of oxygen or air 74 can take the form of an air tank or the ambient atmosphere. A filter 76 ensures that particulate impurities do not enter oxygen delivery system 72. An air compressor controller CS1 controls an air compressor 78 to provide the air to fuel cell stack 12 at a desired flow rate. A mass air flow sensor S8 measures the air flow rate into fuel cell stack 12, providing the value as an input to microcontroller 40. A humidity exchanger 80 adds water vapor to the air to keep the ion exchange membrane 26 moist. Humidity exchanger 80 also removes water vapor which is a byproduct of the electrochemical reaction. Excess liquid water is provided to an evaporator 58.

Fuel cell system 10 removes excess heat from fuel cell stack 12 and uses the excess heat to warm fuel tanks 52 by way of a cooling system 82. Cooling system 82 includes a fuel cell temperature sensor S1, for example a thermister that monitors the core temperature of the fuel cell stack 12. The temperature is provided as input to microcontroller 40. A stack current sensor S2, for example a Hall sensor, measures the gross current through the fuel cell stack 12, and provides the value of the current as an input to microcontroller 40. A cooling fan controller CS3 controls the operation of one or more cooling fans 84 for cooling fuel cell stack 12. After passing through the fuel cell stack 12, the warmed cooling air circulates around the fuel tanks 52. The warmed cooling air then passes through the evaporator 58. A power circuit relay controller CS6 connects, and disconnects, fuel cell stack 12 to, and from, an external electrical circuit in response to microcontroller 40. A power diode 59 provides one-way isolation of the fuel cell system 10 from the external load to provide protection to the fuel cell system 10 from the external load. A battery relay controller CS8 connects, and disconnects, fuel cell monitoring and control system 14 between fuel cell stack 12 and battery 47.

The fuel cell monitoring and control system 14 (illustrated in FIG. 4) includes sensors for monitoring fuel cell system 10 surroundings and actuators for controlling fuel cell system 10 accordingly. For example, a hydrogen concentration sensor S5 (shown in FIG. 3) for monitoring the hydrogen concentration level in the ambient atmosphere surrounding fuel cell stack 12. The hydrogen concentration sensor S5 can take the form of a heater element with a hydrogen sensitive thermister that may be temperature compensated. An oxygen concentration sensor S7 (illustrated in FIG. 4) to monitor the oxygen concentration level in the ambient atmosphere surrounding fuel cell system 10. An ambient temperature sensor S10 (shown in FIG. 3), for example a digital sensor, to monitor the ambient air temperature surrounding fuel cell system 10.

Figure 4:
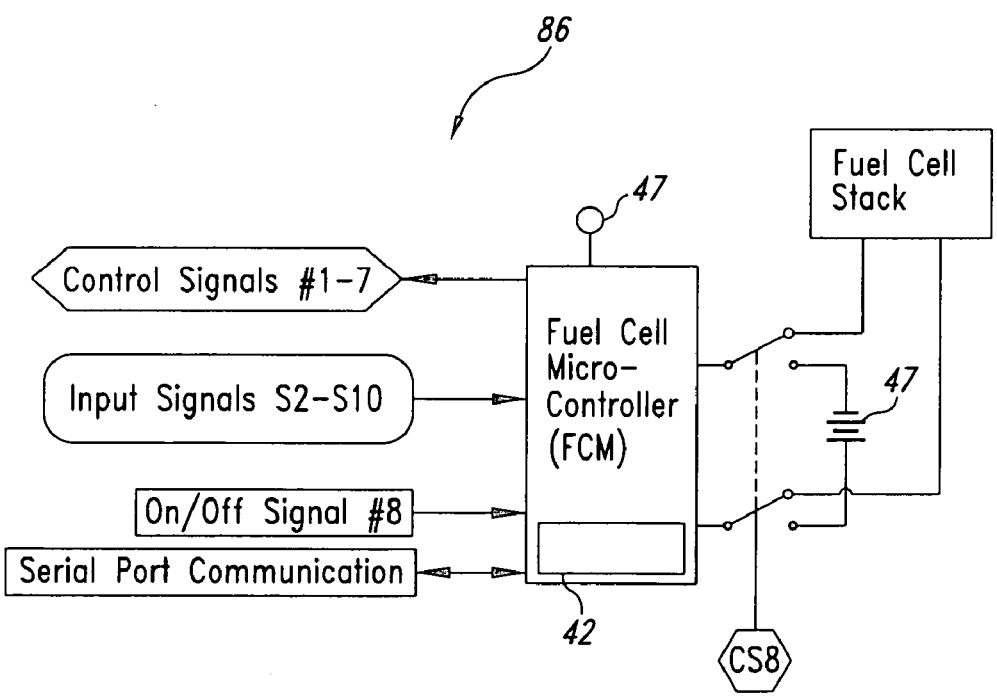
FIG. 4 is a schematic diagram of an additional portion of the fuel cell ambient environment monitoring and control system of FIG. 3, including a fuel cell microcontroller selectively coupled between the fuel cell stack and a battery.

With reference to FIG. 4, microcontroller 40 receives the various sensor measurements such as ambient air temperature, fuel pressure, hydrogen concentration, oxygen concentration, fuel cell stack current, air mass flow, cell voltage check status, voltage across the fuel cell stack, and voltage across the purge cell portion of the fuel cell stack from various sensors described below. Microcontroller 40 provides the control signals to the various actuators, such as air compressor controller CS1, cooling fan controller CS3, purge valve controller CS4, main gas valve solenoid CS5, power circuit relay controller CS6, hydride tank valve solenoid CS7, and battery relay controller CS8.

Fuel Cell System Structural Arrangement

FIGS. 5–8 illustrate the structural arrangement of the components in fuel cell system 10. For convenience, "top", "bottom", "above", "below" and similar descriptors are used merely as points of reference in the description, and while corresponding to the general orientation of the illustrated fuel cell system 10 during operation, are not to be construed to limit the orientation of the fuel cell system 10 during operation or otherwise.

Figure 5:
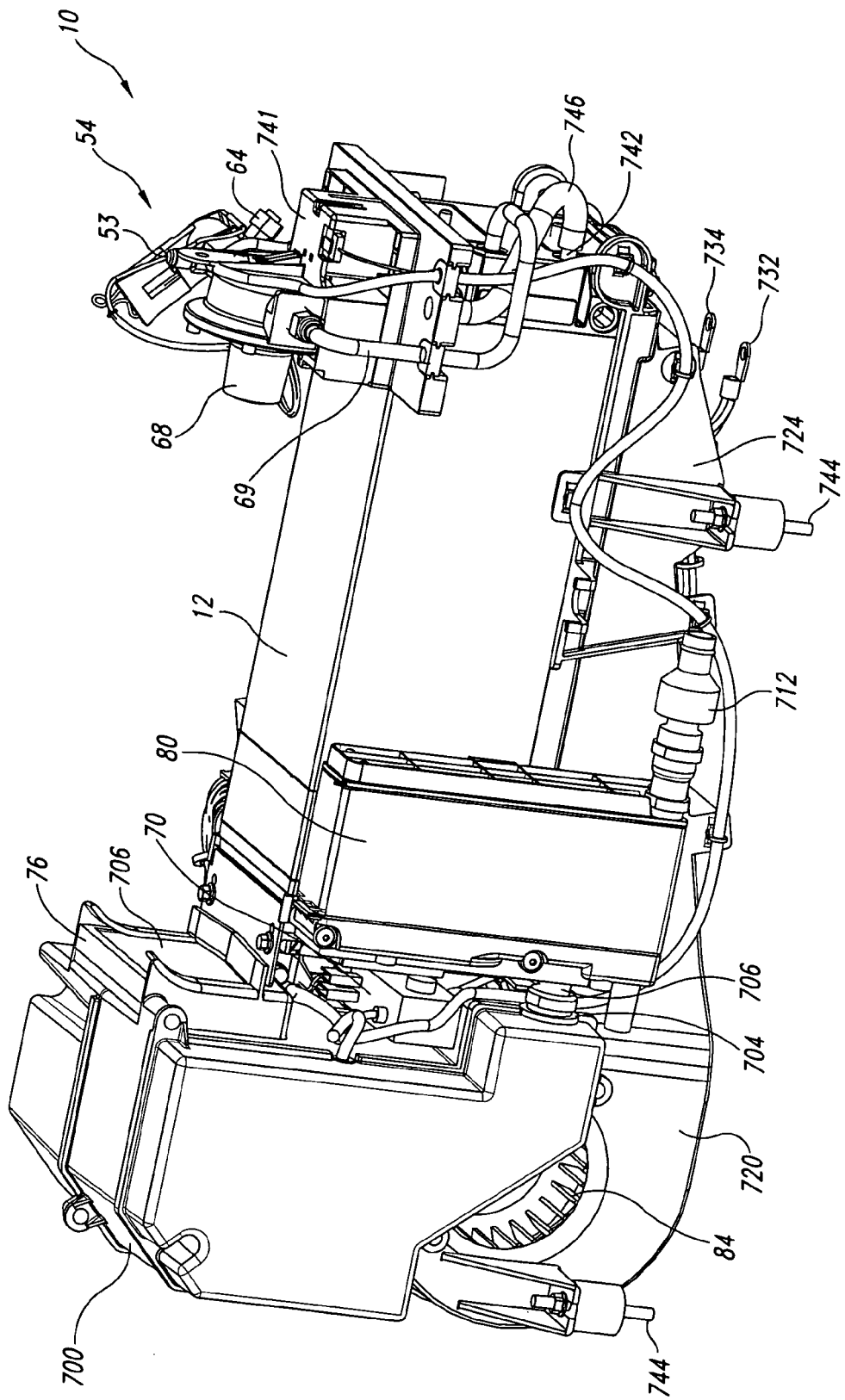
FIG. 5 is a top, right isometric view of a structural arrangement of various components of the fuel cell system of FIG. 1.
Figure 6:
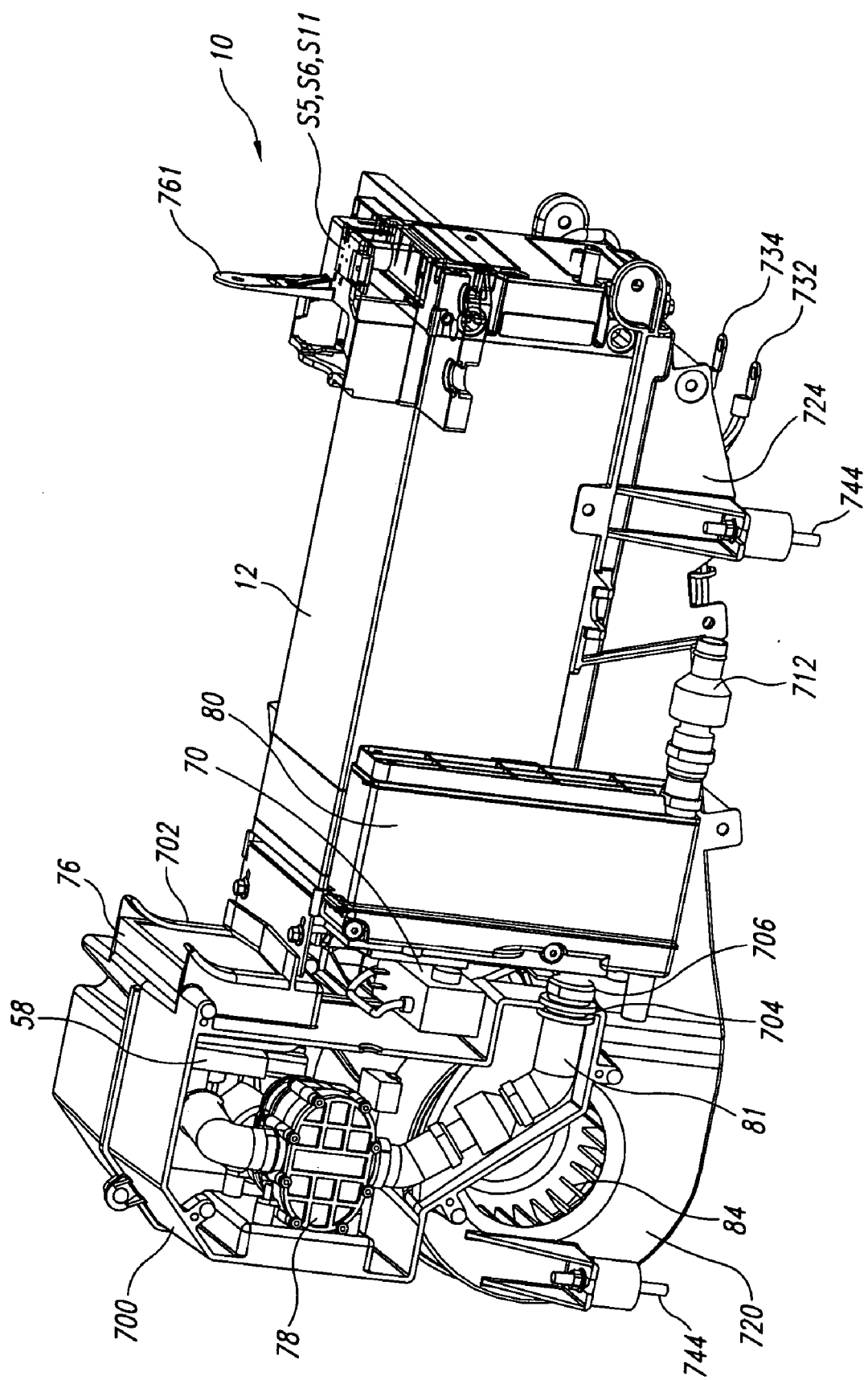
FIG. 6 is a top, right isometric view of the structural arrangement of various components of the fuel cell system of FIG. 5 with a cover removed.
Figure 7:
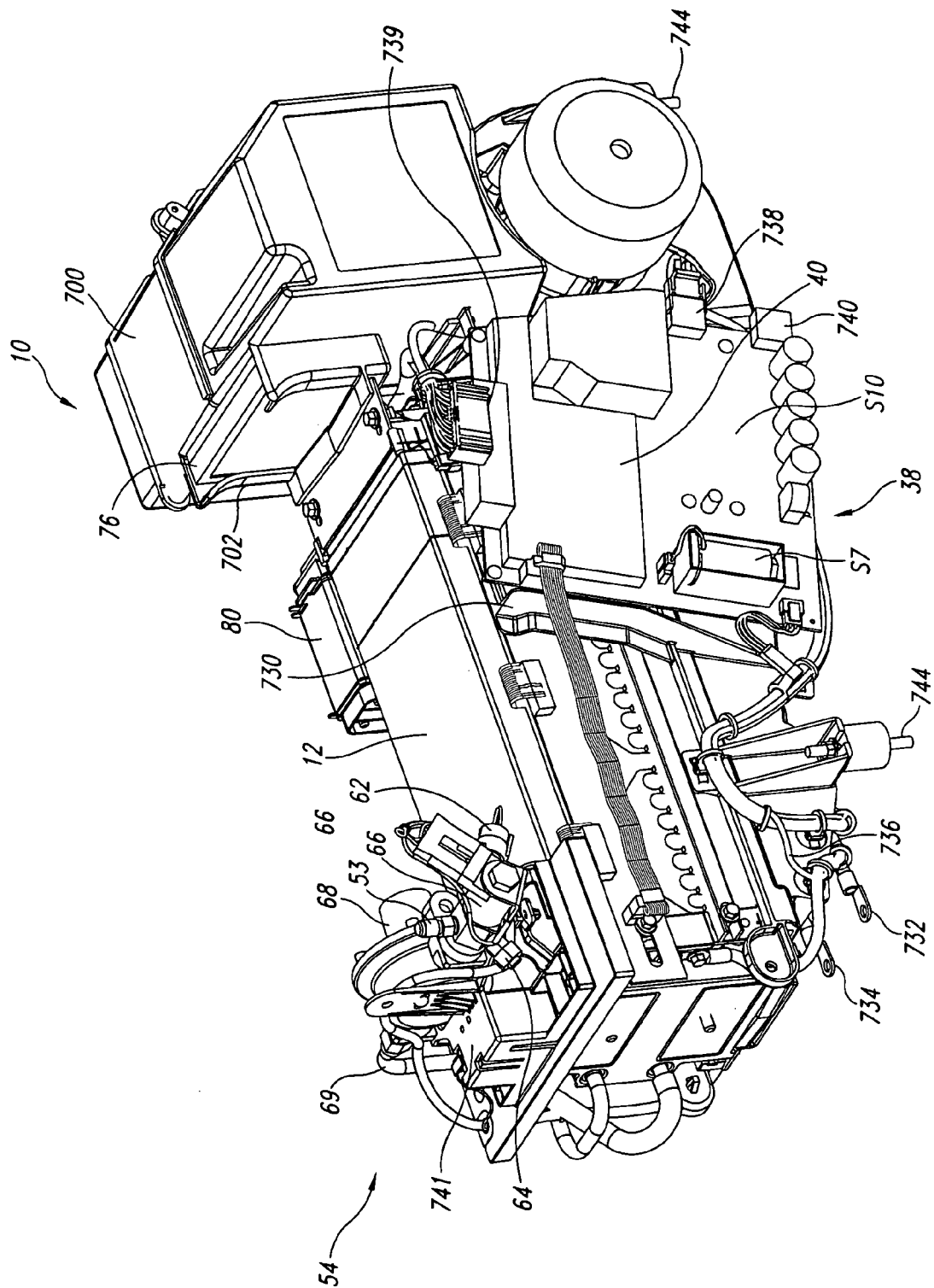
FIG. 7 is top, left isometric view of the structural arrangement of various components of the fuel cell system of FIG. 5.

Referring to FIGS. 5–7, the air compressor 78 and cooling fan 84 are grouped together at one end ("air supply end") of the fuel cell stack 12. Fuel tanks 52 (not shown in FIGS. 5–7) are mountable to the fuel cell system 10 on top of, and along the length of, the fuel cell stack 12. The components of fuel regulating system 54 upstream of the fuel cell stack 12 are located generally at the end of stack 12 ("hydrogen supply end") opposite the air supply end.

Air compressor 78 is housed within an insulated housing 700 that is removably attached to the fuel cell stack 12 at the air supply end. The housing 700 has an air supply aperture 702 covered by the filter 76 that allows supply air into housing 700. The air compressor 78 is a positive displacement low pressure type compressor and is operable to transmit supply air to air supply conduit 81 at a flow rate controllable by the operator. An air supply conduit 81 passes through a conduit aperture 704 in compressor housing 700 and connects with an air supply inlet 706 of humidity exchanger 80. Mass flow sensor S8 is located on an inlet of air compressor 78 and preferably within compressor housing 700.

The humidity exchanger 80 may be of the type disclosed in U.S. Pat. No. 6,106,964, and is mounted to one side of fuel cell stack 12 near the air supply end. Air entering into humidity exchanger 80 via air supply conduit 81 is humidified and then exhausted from the humidity exchanger 80 and into the fuel cell stack 12 (via the supply air inlet port of the end plate 18b). Exhaust air from the fuel cell stack 12 exits via the exhaust air outlet port in end plate 18b and is directed into humidity exchanger 80, where water in the air exhaust stream is transferred to the air supply stream. The air exhaust stream then leaves the humidity exchanger 80 via the air exhaust outlet 712 and is transmitted via an air exhaust conduit (not shown) to evaporator 58 (not shown in FIGS. 5–7) mountable to a cover (not shown) above fuel cell stack 12.

Cooling fan 84 is housed within a fan housing 720 that is removably mounted to the air supply end of fuel cell stack 12 and below compressor housing 700. Fan housing 720 includes a duct 724 that directs cooling air from cooling fan 84 to the cooling channel openings at the bottom of fuel cell stack 12. Cooling air is directed upwards and through fuel cell stack 12 (via the cooling channels 32) and is discharged from the cooling channel openings at the top of fuel cell stack 12. During operation, heat extracted from fuel cell stack 12 by the cooling air is used to warm fuel tanks 52 that are mountable directly above and along the length of stack 12. Some of the warmed cooling air can be redirected into the air supply aperture 702 of compressor housing 700 for use as oxidant supply air.

Referring particularly to FIG. 7, circuit board 38 carrying microcontroller 40, oxygen sensor S7 and ambient temperature sensor S10 is mounted on the side of fuel cell stack 12 opposite humidity exchanger 80 by way of a mounting bracket 730. Positive and negative electrical power supply lines 732, 734 extend from each end of fuel cell stack 12 and are connectable to an external load. An electrically conductive bleed wire 736 from each of power supply lines 732, 734 connects to circuit board 38 at a stack power-in terminal 738 and transmits some of the electricity generated by fuel cell stack 12 to power the components on the circuit board 38, as well as sensors 44 and actuators 46 which are electrically connected to circuit board 38 at terminal 739. Similarly, battery 47 (not shown in FIGS. 5–7) is electrically connected to circuit board 38 at battery power in terminal 740. Battery 47 supplies power to the circuit board components, sensors 44 and actuators 46 when fuel cell stack output has not yet reached nominal levels (e.g., at start-up); once fuel cell stack 12 has reached nominal operating conditions, fuel cell stack 12 can also supply power to recharge the battery 47.

Figure 8:
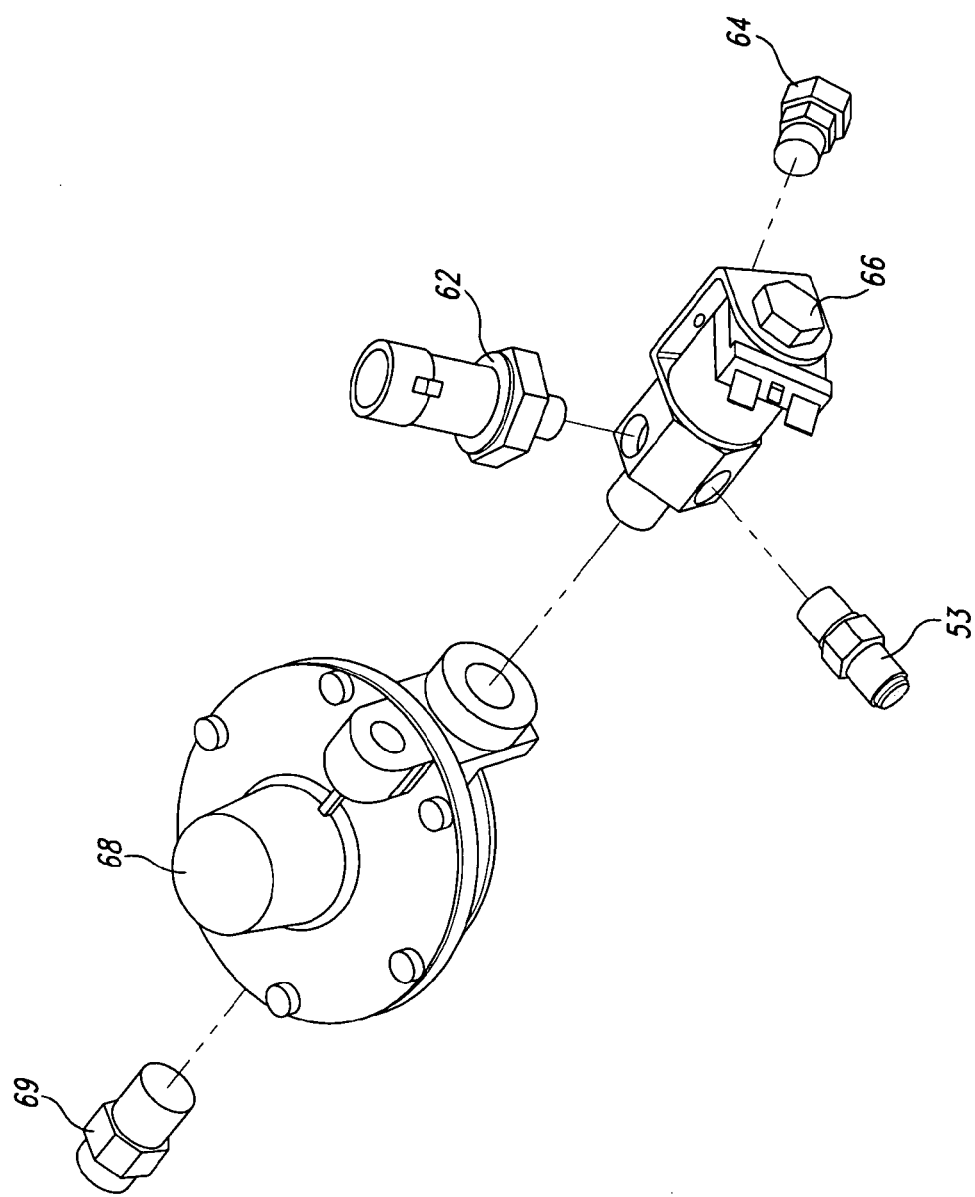
FIG. 8 is a top, right isometric exploded view of a pressure regulator portion of the fuel cell system of FIG. 5.

Referring generally to FIGS. 5–7 and particularly to FIG. 8, a bracket 741 is provided at the hydrogen supply end for the mounting of a fuel tank valve connector 53, hydrogen pressure sensor 62, pressure relief valve 64, main gas valve 66, and hydrogen pressure regulator 68 above the fuel cell stack 12 at the hydrogen supply end. A suitable pressure regulator may be a Type 912 pressure regulator available from Fisher Controls of Marshalltown, Iowa. A suitable pressure sensor may be a transducer supplied Texas Instruments of Dallas, Tex. A suitable pressure relief valve may be supplied by Schraeder-Bridgeport of Buffalo Grove, Ill. The pressure relief valve 64 is provided for fuel tanks 52 and may be set to open at about 350 psi. A low pressure relief valve 742 is provided for the fuel cell stack 12. The bracket 741 also provides a mount for hydrogen concentration sensor S5, hydrogen heater current sensor S6 and hydrogen sensor check sensor S11, which are visible in FIG. 6 in which the bracket 741 is transparently illustrated in hidden line. The fuel tanks 52 are connectable to the fuel tank connector 53. When the fuel tank and main gas valves 56, 66 are opened, hydrogen is supplied under a controlled pressure (monitored by pressure sensor 62 and adjustable by hydrogen pressure regulator 68) through the fuel supply conduit 69 to the fuel inlet port of end plate 18a. The purge valve 70 is located at the fuel outlet port at end plate 18b.

The fuel cell system 10 and fuel tanks 52 are coupled to a base (not shown) at mounting points 744 and housed within a fuel cell system cover (not shown). Cooling air exhausted from the top of the fuel cell stack 12 is thus directed by the cover either to the supply air inlet 702 or over fuel regulating system 54 to a cooling air discharge opening in the housing.

The fuel cell system 10 is designed so that components that are designed to discharge hydrogen or that present a risk of leaking hydrogen, are as much as practical, located in the cooling air path or have their discharge/leakage directed to the cooling air path. The cooling air path is defined by duct 724, cooling air channels of stack 12, and the portion of the system cover above stack 12; a cooling air stream passing through the cooling air path is shown by the arrows in FIGS. 5, 6 and 7. The components directly in the cooling air path include fuel tanks 52, and components of fuel regulating system 54 such as pressure relief valve 64, main gas valve 66, and hydrogen regulator 68. Components not directly in the cooling air path are fluidly connected to the cooling air path, and include purge valve 70 connected to duct 724 via purge conduit (not shown) and low pressure relief valve 742 connected to an outlet near fuel regulating system 54 via conduit 746. When cooling air fan 84 is operational, the cooling air stream carries leaked/discharged hydrogen through duct 724, past stack 12, and out of system 10 in the direction of the arrows shown in FIGS. 5, 6, and 7. Hydrogen concentration sensor S5 is strategically placed as far downstream as possible in the cooling air stream to detect hydrogen carried in the cooling air stream.

Hydrogen concentration sensor S5 is also placed in the vicinity of the components of fuel regulating system 54 to improve detection of hydrogen leaks/discharges from fuel regulating system 54.

Exemplary Method of Operation

Fuel cell system 10 can employ a number of operating states that may determine which operations or tasks microcontroller 40 executes, and may determine the response of microcontroller 40 to various readings or measurements of the fuel cell system operating parameters. Microcontroller 40 executes software that can be programmed into and executed from an on-chip flash memory of microcontroller 40 or in other controller-readable memory. In particular, fuel cell system 10 can employ a standby state, starting state, running state, warning state, failure state, and stopping state.

In a standby state fuel cell stack 12 is not operating and the microcontroller 40 monitors a startline for a startup signal. For example, operator activation of a start button or switch (not shown) can generate the startup signal on the startup line.

In a starting state, microcontroller 40 initializes itself, places all actuators and control devices in their proper initial states, enables a serial interface, starts a watchdog timer, and performs a series of checks to ensure that all systems and components are operational. If the outcomes of the checks are satisfactory, microcontroller 40 causes the external load to be connected and enters a running state, otherwise the fuel cell system 10 enters a failure state without becoming operational.

In a running state, fuel and oxidant are supplied to the fully operational fuel cell stack 12. Microcontroller 40 monitors the performance of the fuel cell system 10 based on the measured operating parameters, and controls the various systems via the various actuators discussed above. If microcontroller 40 determines that one or more operating parameters are outside of a warning range, microcontroller 40 places fuel cell system 10 into a warning state. If microcontroller 40 determines that one or more operating parameters are outside of a failure range, microcontroller 40 places the fuel cell system into a failure state. Otherwise, fuel cell system 10 continues in a running state until a stop signal is received on the startup line. In response to the stop signal, microcontroller 40 advances fuel cell system 10 from a running state to a stopping state if fuel cell system 10 has been in a running state for at least one minute. If so, the microcontroller 40 begins an extended shutdown procedure lasting approximately 45 seconds, during which time the fuel cell system 12 is in a stopping state. If not, microcontroller 40 engages the normal shutdown procedure and fuel cell system 10 proceeds directly from a running state to a standby state.

In a warning state, microcontroller 40 can provide a warning notification of the out-of-warning-range condition to the operator, but otherwise fuel cell system 10 continues to operate. Additionally, microcontroller 40 can write a warning condition code corresponding to the out-of-warning-range condition to persistent memory 42.

In a failure state, microcontroller 40 immediately stops operation of fuel cell system 10 and writes a fault condition code to persistent memory 42. Fuel cell system 10 remains in a failure state until a stop signal is received on the startline. In response to the stop signal, microcontroller 40 completes the shut down of fuel cell system 10 and places fuel cell system 10 into a standby state.

In a stopping state, microcontroller 40 shuts down the various components of fuel cell system 10, stopping operation of fuel cell system 10. Once the various components have been shut down, microcontroller 40 places fuel cell system 10 into a standby state.

Figure 9:
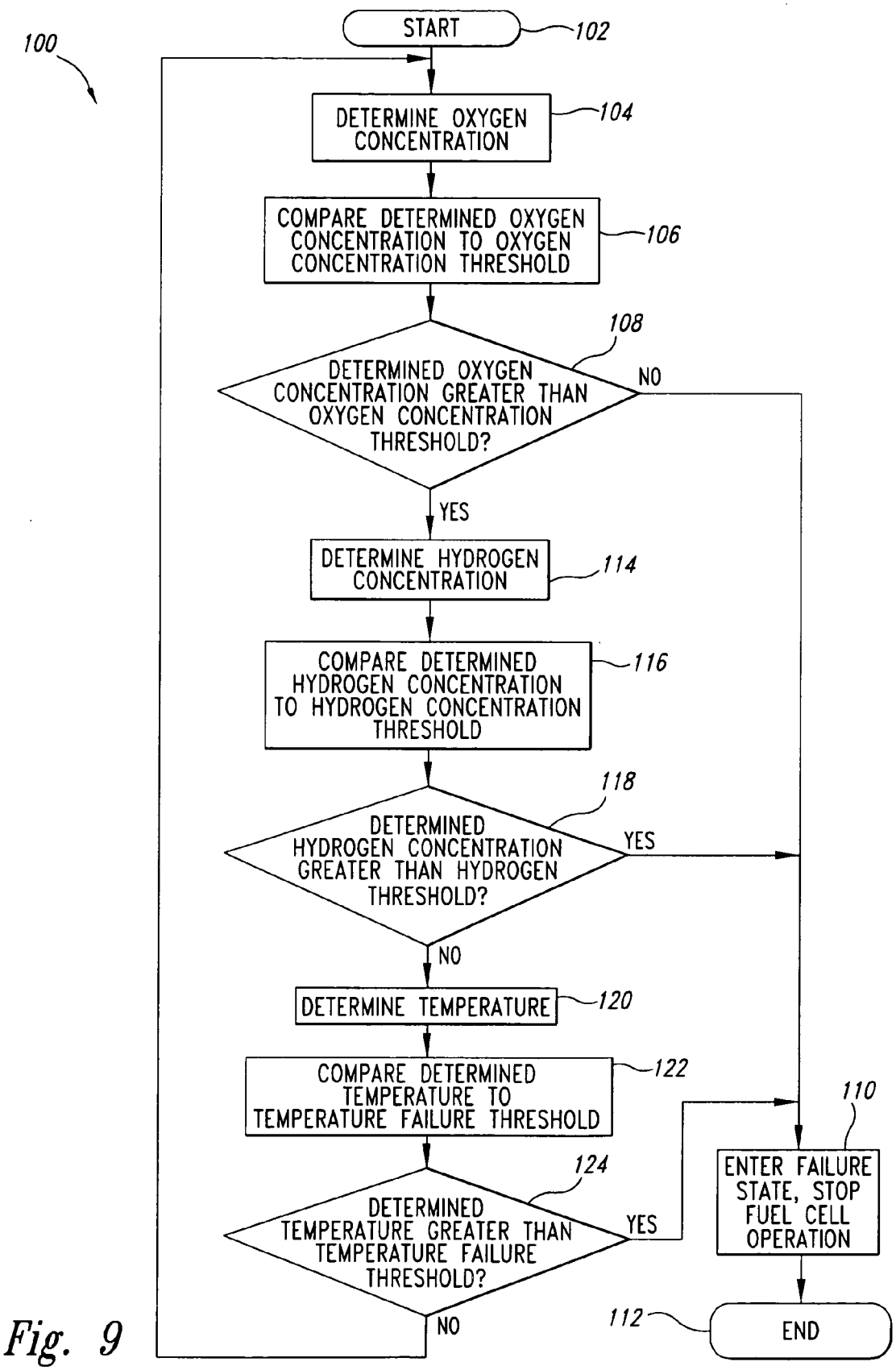
FIG. 9 is a flow diagram of an illustrated embodiment of operation for the fuel cell system of FIGS. 1–8.

FIG. 9 shows an exemplary method 100 of operation for fuel cell system 10 starting in step 102. In step 104, microcontroller 40 determines the oxygen concentration in the ambient atmosphere surrounding the fuel cell system 10. Microcontroller 40 relies on an oxygen concentration measurement from the oxygen concentration sensor S7. Microcontroller 40 may scale or correct the measurement using oxygen concentration sensor constants stored in the persistent memory 42 which are specific to the particular oxygen concentration sensor S7 in the fuel cell system 10. In step 106, microcontroller 40 compares the determined oxygen concentration level to an oxygen concentration threshold value. Microcontroller 40 can ascertain whether the reading from the oxygen concentration sensor S7 is within normal operating limits to detect malfunctions of oxygen concentration sensor S7. For example, in the described embodiment, analog signals from oxygen concentration sensor S7 may be considered valid if between 2.0V and 4.25V.

The oxygen concentration threshold value is set at approximately 18%, which corresponds to a lower limit for sustaining human health. Generally, operating fuel cell system 10 in larger, well-ventilated and well-stirred rooms should not deplete the oxygen level in the room below the oxygen concentration threshold. The risk of depleting the oxygen level below the oxygen concentration threshold increases with smaller room sizes and/or poorer ventilation.

In a typical smaller-sized residential room having relatively poor ventilation, continuous operation of fuel cell system 10 at a relatively low load setting may deplete the oxygen level in the room below the oxygen concentration threshold in a matter of hours. For example, for fuel cell system 10 having a rated net output of about 1 kW (maximum voltage 50 VDC) consuming fuel at about 16 slpm at maximum rated power, consuming air at up to 90 slpm at maximum rated power, and operating continuously at a load setting of 10 amperes in a 8'×9'×8' room having a relatively poor ventilation rate of 0.25 Air Changes per Hour (ACH), the oxygen level in the room was depleted below 18% in less than ten hours.

To ensure that fuel cell system 10 does not operate when the oxygen level has fallen below the oxygen concentration threshold, microcontroller 40 regularly samples readings from oxygen sensor S7. The sampling may be performed continuously or periodically. Referring back to FIG. 9, if the determined oxygen concentration is below the oxygen concentration threshold, in step 108 microcontroller 40 is configured to pass control to step 110 to shut down operation of fuel cell system 10. The method 100 terminates in step 112. If the determined oxygen concentration is greater than the oxygen concentration threshold, in step 108 microcontroller 40 passes control to step 114.

As discussed above, microcontroller 40 is configured to open the purge valve 70 intermittently to discharge impurities and other non-reactive components that have accumulated in the fuel passages of fuel cell stack 12. The discharge may include trace amounts of unreacted hydrogen. To ensure that the hydrogen discharge from fuel cell stack 12 does not cause the hydrogen concentration in the room to build to a flammable concentration, microcontroller 40 is configured to shut down fuel cell system 10 operation in the event that the hydrogen concentration in the vicinity of fuel cell system 10 exceeds a hydrogen concentration threshold.

The hydrogen concentration threshold is set at 1%, significantly below the lower flammability limit (LFL) for hydrogen (i.e., 4% of atmosphere). In step 114, microcontroller 40 determines the hydrogen concentration. Microcontroller 40 relies on a hydrogen concentration reading from the hydrogen concentration sensor S5. In step 116, microcontroller 40 compares the determined hydrogen concentration to a hydrogen concentration threshold. If the determined hydrogen concentration is greater than the hydrogen concentration threshold, in step 118 microcontroller 40 passes control to step 110 to shut down the fuel cell system 10. If the determined hydrogen concentration is less than the hydrogen concentration threshold, in step 118 microcontroller 40 passes control to step 120.

Microcontroller 40 is configured to control the operation of purge valve 70 to limit the average rate of hydrogen discharged on a continuous basis for fuel cell system 10 to below a critical hydrogen discharge rate, i.e., the minimum rate that would cause the hydrogen concentration in the vicinity of fuel cell system 10 to exceed a high hydrogen condition before the oxygen concentration in the vicinity of fuel cell system 10 falls below the oxygen concentration threshold value. This ensures that the occurrence of a low oxygen condition (where the oxygen concentration of the room falls below the oxygen concentration threshold) will initiate a system shutdown before the occurrence of a high hydrogen concentration condition. In this embodiment, the high hydrogen concentration condition is configured to correspond to the LFL of hydrogen, namely, of about 4% of atmosphere.

By configuring microcontroller 40 in this manner, the fuel cell system 10 should cease operation before the LFL is reached even in the event of a hydrogen sensor S7 failure, provided that the average continuous hydrogen discharge rate from the system does not exceed the critical hydrogen discharge rate. In one scenario, i.e., for a room such as a closet having dimensions 36×40×96 inches with relatively low air exchange of 0.05 ACH, the critical hydrogen discharge rate is approximately 1 liter/minute (continuous). Thus, the oxygen concentration monitoring can serve as a backup for hydrogen concentration monitoring if the anticipated or expected dissipation of hydrogen from fuel cell system 10, for example from controlled purging and/or from anticipated leaks, is maintained at a level below the critical hydrogen discharge rate. Fuel cell system 10 can employ larger critical hydrogen discharge rates if it is certain that fuel cell system 10 will operate in larger rooms and/or in rooms with higher air exchange rates than set out for the scenario, above. Empirical testing can be performed to determine the appropriate critical hydrogen discharge rates for different rooms and different air exchange rates.

In step 120, microcontroller 40 determines the temperature of fuel cell stack 12. Microcontroller 40 relies on the temperature measurement from the fuel cell temperature sensor S1. In step 122, microcontroller 40 compares the determined temperature to a temperature failure threshold. If the determined temperature is greater than the temperature failure threshold, in step 124 microcontroller 40 passes control to step 110 to shut down operation of the fuel cell stack 12. If the determined temperature is not greater than the temperature failure threshold, the microcontroller 40 in step 124 returns control to step 104 to monitor operation of fuel cell system 10.

Alternatively, or additionally, microcontroller 40 determines the temperature of the ambient air proximate fuel cell stack 12. The microcontroller 40 relies on the temperature measurement from the ambient air temperature sensor S10. In alternative or additional step 122, microcontroller 40 compares the determined temperature to an ambient air temperature failure threshold. Microcontroller 40 passes control to step 110 entering a failure state to stop operation of fuel cell stack 12 if the ambient air temperature is below the ambient air temperature failure threshold, since water vapor in the reactant channels 30 may be frozen. In an alternative embodiment, microcontroller 40 can additionally, or alternatively determine if the temperature of the ambient air is too high for operation, passing control to step 110 to stop operation of fuel cell stack 12 if the temperature exceeds an upper ambient temperature failure threshold.

Figure 10:
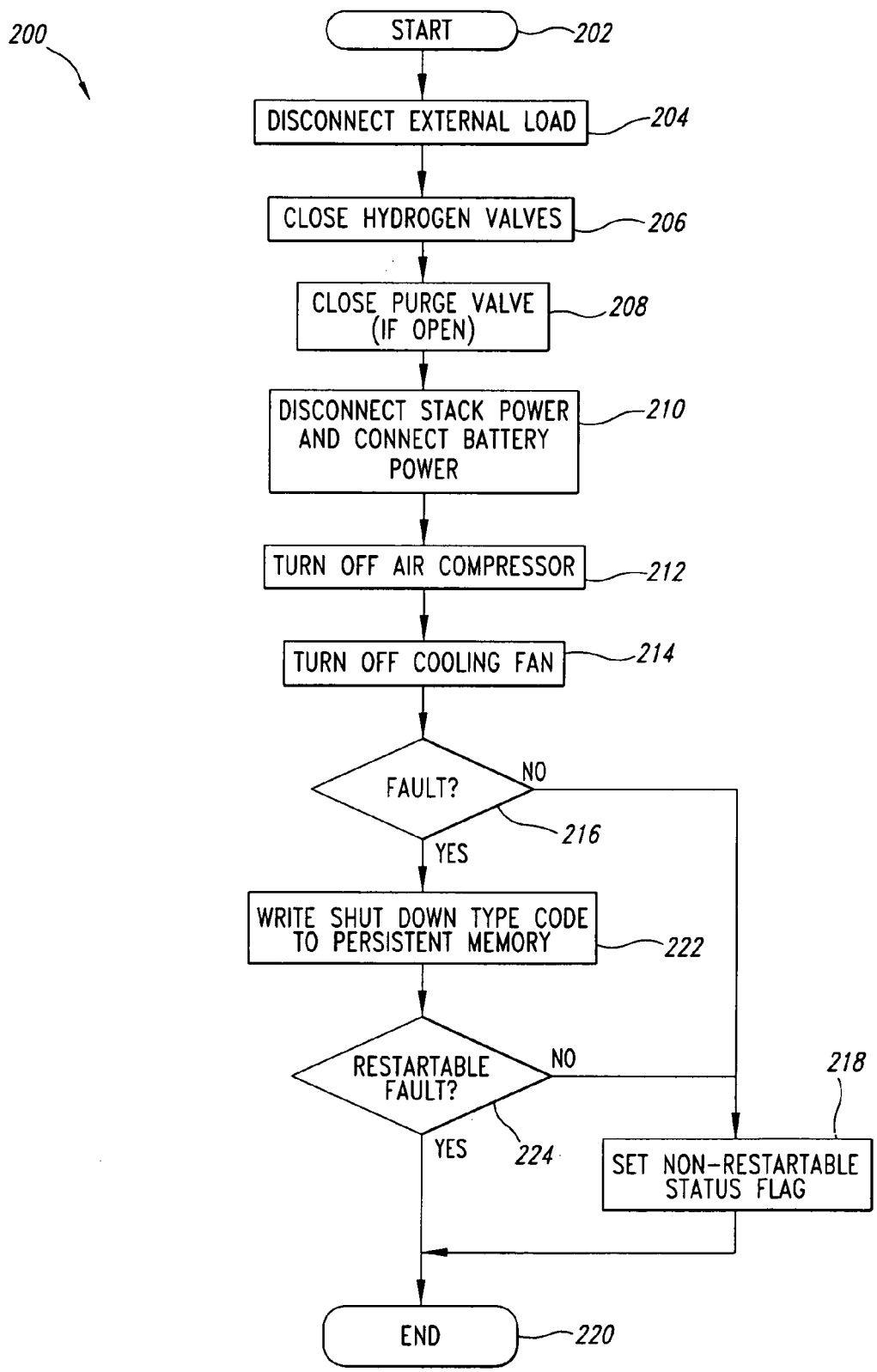
FIG. 10 is a flow diagram of an illustrated embodiment of a method of shutting down the operation of the fuel cell system of FIGS. 1–8.

FIG. 10 shows a failure state method 200 for stopping operation of the fuel cell system 10 in response to either a low oxygen concentration or a high hydrogen concentration in the ambient atmosphere, starting in step 202. In step 204, microcontroller 40 disconnects an external load from fuel cell system 10 by, for example, opening the circuit relay with the power circuit relay controller CS6, while continuing to supply power to the electronic fuel cell monitoring and control system 14. In step 206, microcontroller 40 closes main gas valves 66 and hydrogen regulator 68. Additionally, microcontroller 40 may close the hydrogen tank valves 56 where such values are automatically controlled by microcontroller 40. In step 208, microcontroller 40 sends an appropriate signal to the purge valve controller CS4 to close the purge valve 70, if the purge valve is open. While the purge valve is typically closed during operation, the purge valve may open for brief intervals, for example, to purge impurities from the fuel cell stack 12. The method 200 ensures that the purge valve is closed as part of the stopping procedure.

In step 210, microcontroller 40 disconnects the stack power which provides power from fuel cell stack 12 to operate fuel cell system 10 including fuel cell electronic fuel cell monitoring and control system 14. In the same step, the fuel cell electronic control system 14 switches to battery power. In step 212, microcontroller 40 provides signals to air compressor controller CS1 to turn off the air compressor 78. In step 214, microcontroller 40 provides a signal to the cooling fan controller CS3 to turn off the cooling fans 84.

In step 216, microcontroller 40 determines whether a fault has occurred in the fuel cell system 10. The faults can include an out of range operating parameter, such as excessive hydrogen concentration, low oxygen concentration, excessive stack current, low stack voltage, high stack temperature, low or high ambient temperature, or low battery voltage. Faults can also include microcontroller failures or errors, such as a faulty register. If a fault has occurred, microcontroller 40 passes control to step 218 in which the system variables are reset, and the shutdown method 200 terminates in step 220. If a fault has not occurred, control is passed to step 222, where microcontroller 40 writes a fault condition code to the persistent memory 42.

Storing the fault condition code in persistent memory 42 permits microcontroller 40 to recall the fault condition code on subsequent attempts to restart the fuel cell system 10. Certain fault condition codes may be classed as restartable faults, indicating to the microcontroller 40 that the microcontroller 40 may restart the fuel cell system 10 after a shut down. Other fault condition codes may be classed as non-restartable faults, indicating to microcontroller 40 that microcontroller 40 may not restart the fuel cell system 10 after a shut down. The classification of the fault condition codes may be based on severity of the fault, and/or the likelihood that a shut down will remedy the cause of the fault. The stored fault condition code may also be used in diagnosing the fuel cell system 10.

In step 224, microcontroller 40 determines whether the fault was a restartable fault. A restartable fault occurs when the fault is not expected to affect fuel cell system 10 when fuel cell system 10 is restarted. If a non-restartable fault has occurred, microcontroller 40 passes control to step 218 to set a non-restartable status flag in the persistent memory 42 and the microcontroller 40 terminates the method in step 220. If a restartable fault has not occurred, then microcontroller 40 passes control directly to step 220 to terminate operation.

Although specific embodiments, and examples of, the invention are described herein for illustrative purposes, various equivalent modifications can be made without departing from the spirit and scope of the invention, as will be recognized by those skilled in the relevant art. The teachings provided herein of the invention can be applied to other fuel cell systems, not necessarily the solid polymer fuel cell system described above.

Commonly assigned U.S. patent applications Ser. No. 09/916,117, entitled FUEL CELL CONTROLLER SELF INSPECTION; Ser. No. 09/916,115, entitled FUEL CELL ANOMALY DETECTION METHOD AND APPARATUS; Ser. No. 09/916,211, entitled FUEL CELL PURGING METHOD AND APPARATUS; Ser. No. 09/916,213, entitled FUEL CELL RESUSCITATION METHOD AND APPARATUS, now U.S. Pat. No. 6,861,167; Ser. No. 09/916,240, entitled FUEL CELL SYSTEM METHOD, APPARATUS AND SCHEDULING, now U.S. Pat. No. 6,887,606; Ser. No. 09/916,239, entitled FUEL CELL SYSTEM AUTOMATIC POWER SWITCHING METHOD AND APPARATUS; Ser. No. 09/916,118, entitled PRODUCT WATER PUMP FOR FUEL CELL SYSTEM, now abandoned; and Ser. No. 09/916,212, entitled FUEL CELL SYSTEM HAVING A HYDROGEN SENSOR, now U.S. Pat. No. 6,913,847, all filed Jul. 25, 2001, are incorporated herein by reference, in their entirety.

The various embodiments described above and in the applications and patents incorporated herein by reference can be combined to provide further embodiments. The described methods can omit some acts and can add other acts, and can execute the acts in a different order than that illustrated, to achieve the advantages of the invention.

These and other changes can be made to the invention in light of the above detailed description. In general, in the following claims, the terms used should not be construed to limit the invention to the specific embodiments disclosed in the specification, but should be construed to include all fuel cell systems, controllers and processors, actuators, and sensors that operate in accordance with the claims. Accordingly, the invention is not limited by the disclosure, but instead its scope is to be determined entirely by the following claims.

What is claimed is:

1. A power generation system comprising:
    a fuel cell stack comprising at least one fuel cell, an oxidant inlet, an oxidant outlet, a fuel inlet and a fuel outlet;
    a fuel delivery system for delivering fuel to the fuel inlet of the fuel cell stack;
    an oxidant delivery system for delivering oxidant to the oxidant inlet of the fuel cell stack;
    an oxygen sensor for measuring an oxygen concentration of ambient air in a vicinity of the power generation system;
    a hydrogen concentration sensor for measuring a hydrogen concentration in the ambient air in the vicinity of the power generation system; and
    a controller communicatingly coupled to receive signals from the oxygen sensor and from the hydrogen concentration sensor, the controller configured to cease delivery of fuel to the fuel cell stack by the fuel delivery system in response to the earlier of either the hydrogen concentration measured by the hydrogen concentration sensor exceeding a hydrogen concentration threshold or the oxygen concentration measured by the oxygen sensor falling below an oxygen concentration threshold.

2. The power generation system of claim 1 further comprising:
    a purge valve associated with the fuel outlet, wherein the controller is coupled to control the purge valve, the controller configured to intermittently open the purge valve such that hydrogen discharged from the fuel cell stack during operation of the power generation system does not cause a hydrogen concentration in the vicinity of the power generation system to exceed a high hydrogen concentration condition during normal operation.

3. The power generation system of claim 1, further comprising:
    a purge valve associated with the fuel outlet, wherein the controller is coupled to control the purge valve, the controller configured to intermittently open the purge valve such that an average continuous rate of hydrogen discharged from the fuel cell stack during operation of the power generation system does not exceed a critical hydrogen discharge rate that would cause the hydrogen concentration in the vicinity of the power generation system to exceed a high hydrogen concentration condition during normal operation.

4. The power generation system of claim 1 wherein the hydrogen concentration threshold is approximately 1%.

5. The power generation system of claim 1 wherein the oxygen concentration threshold is approximately 18%.

6. The power generation system of claim 1 further comprising:
    a temperature sensor coupled to provide signals to the controller, wherein the controller is configured to cease delivery of fuel to the fuel cell stack by the fuel delivery system in response to a temperature reading exceeding a high temperature threshold.

7. A method of operating a power generation system comprising a fuel cell stack, the method comprising:
    delivering fuel to the fuel cell stack;
    delivering oxidant to the fuel cell stack;
    monitoring an oxygen concentration of ambient air in a vicinity of the power generation system;
    monitoring a hydrogen concentration of the ambient air in the vicinity of the power generation system; and
    ceasing the delivery of fuel to the fuel cell stack in response to the earlier of either the hydrogen concentration of the ambient air in the vicinity of the power generation system exceeding a hydrogen concentration threshold or the oxygen concentration of the ambient air in the vicinity of the power generation system falling below an oxygen concentration threshold.

8. The method of claim 7, further comprising:
  intermittently discharging hydrogen from the fuel cell stack in a manner that does not cause a hydrogen concentration in the vicinity of the power generation system to exceed a high hydrogen concentration condition during normal operation.

9. The method of claim 8 wherein intermittently discharging hydrogen from the fuel cell stack in a manner that does not cause a hydrogen concentration in the vicinity of the power generation system to exceed a high hydrogen concentration condition during normal operation comprises intermittently discharging hydrogen from the fuel cell stack such that an average rate of hydrogen continuously discharged does not exceed a critical hydrogen discharge rate that would cause the hydrogen concentration in the vicinity of the power generation system to exceed the high hydrogen concentration condition.

10. The method of claim 7 wherein the hydrogen concentration threshold is approximately 1%.

11. The method of claim 7 wherein the oxygen concentration threshold is approximately 18%.

12. The method of claim 7, further comprising:
  monitoring a temperature of the ambient air in the vicinity of the power generation system, and ceasing the delivery of fuel to the fuel cell stack in response to the temperature exceeding a high temperature threshold.

13. A computer-readable media containing instructions to cause a controller to control operation of a power generation system comprising a fuel cell stack by:
  monitoring an oxygen concentration of ambient air in a vicinity of the power generation system;
  monitoring a hydrogen concentration of the ambient air in the vicinity of the power generation system; and
  ceasing the delivery of fuel to the fuel cell stack in response to the earlier of either the hydrogen concentration of the ambient air in the vicinity of the power generation system exceeding a hydrogen concentration threshold or the oxygen concentration of the ambient air in the vicinity of the power generation system falling below an oxygen concentration threshold.

14. The computer-readable media of claim 13 containing instructions to cause a controller to control operation of the power generation system, further by:
  intermittently discharging hydrogen from the fuel cell stack in a manner that does not cause the hydrogen concentration in the vicinity of the power generation system to exceed a high hydrogen concentration condition.

15. The computer-readable media of claim 13 containing instructions to cause a controller to control operation of the power generation system, further by:
  setting the oxygen concentration threshold to approximately 18%.

16. The computer-readable media of claim 13 containing instructions to cause a controller to control operation of the power generation system, further by:
  setting the hydrogen oxygen concentration threshold to approximately 1%.

17. The computer-readable media of claim 13 wherein the oxygen concentration is monitored periodically.

18. The computer-readable media of claim 13, further comprising:
  monitoring a temperature of the ambient air in the vicinity of the power generation system, and
  ceasing the delivery of fuel to the fuel cell stack in response to the temperature exceeding a high temperature threshold.

19. The computer-readable media of claim 13 wherein the computer-readable media comprises a memory structure of a micro-controller.

* * * * *